2,858,334
Patented Oct. 28, 1958

2,858,334

PREPARATION OF PHTHALIC ACIDS

Ralph Landau, East Hills, Robert B. Egbert, Roslyn Heights, and Alfred Saffer, Bayside, N. Y., assignors, by mesne assignments, to Mid-Century Corporation, Chicago, Ill., a corporation of Delaware No Drawing. Application November 26, 1954
Serial No. 471,499

6 Claims. (Cl. 260—524)

This invention relates to processes for the catalytic oxidation of dialkylbenzenes by means of air or other molecular oxygen containing gaseous materials to produce phthalic acids in the presence of a heavy metal compound catalyst, desirably a manganese salt, and more particularly, to such a process wherein the concentration of formic acid in the reaction mixture is maintained below about 5% by weight, and more preferably, below about 3%, and below 10% water.

The various phthalic acids may be prepared by oxidation of certain aryl or alkyl-aryl compounds by so-called chemical oxidation or by catalytic oxidation by means of gaseous oxygen. The art is confronted, however, by the problem of providing such acids in an economic and convenient manner from readily available raw materials, and in some instances, of a desired high purity.

The discoveries associated with the invention and relating to solutions of the above problems, and the objects achieved in accordance with the invention as described herein include the following: the catalytic oxidation by means of molecular oxygen containing gaseous material of a dialkylbenzene wherein both alkyls contain from 1 to 4 carbon atoms and wherein each carbon atom attached directly to the ring contains at least one hydrogen substituent, in the presence of a heavy metal catalyst while removing formic acid and water formed to maintain the concentration of each thereof below 10%; such a process wherein the catalyst is a manganese salt; such a process carried out in the presence of a lower monocarboxylic acid having about 2 to 6 carbon atoms in the molecule, preferably 2 to 4, and preferably using about 1 to 10 parts by weight of the monocarboxylic acid per part of dialkylbenzene; such a process wherein the catalyst is a stoichiometric mixture of manganese acetate and ammonium bromide; the provision of such a process applied specifically to such a compound containing at least one substituent having at least 2 carbon atoms, such as meta or para ethyl toluene, meta or para propyl or isopropyl toluene, meta or para normal or isobutyl toluene; and other objects which will be apparent as details or embodiments of the invention are set forth hereinafter.

In order to facilitate a clear understanding of the invention, the following preferred specific embodiments are described in detail:

Example 1

Into a suitable reactor having a corrosion resistant inner surface (e. g., glass, ceramic or corrosion resistant metal or alloy), equipped with agitating means such as a mechanical agitating device or gas flow agitating means, and with means for heating or cooling the contents thereof such as a coil or jacket, a reflux condenser equipped with a separatory device for collecting water and refluxing non-aqueous condensate to the reaction vessel, a gas inlet tube, and optionally a vent for passing off low boiling materials, there are charged:

125 parts para-cymene
125 parts acetic acid
1 to 2 parts of a manganese salt such as the bromide The reaction vessel is about half filled with the liquid mixture.

Air is fed into the reaction mixture at the rate of 400 liters (measured at atmospheric pressure and about 27° C.) per hour, while the reaction mixture is maintained at 180° C., with vigorous agitation, for two hours; and the pressure is maintained at about 300 to 400 p. s. i. g. (pounds per square inch gage); this pressure being such that the reaction mixture contains a liquid phase containing lower carboxylic acid.

The crude solid terephthalic acid in the mixture is separated by filtration, given three washings with about 100% acetic acid, each washing being with about 100 parts by weight of acetic acid per 40 parts of the precipitate, and then given three washings with water, using approximately similar amounts. The acetic acid washings are distilled; the residue may be recycled to the reactor or may be processed to recover isophthalic acid. The exit gases from the reactor were passed through two Dry Ice traps in series, and the liquid collected therein during the reaction was washed with about 2 volumes of water to remove water soluble materials therefrom, and then added to the above filtrate. The filtrate was then combined with the residue from the acetic acid washings, and the mixture distilled.

The distillation was continued until the temperature reached 139° C. at 1–2 mm. Hg pressure. The distillation was then continued up to a temperature of 250° C. at 1–2 mm. Hg pressure. The residue remaining in the distillation vessel was resinuous and carbonaceous. The distillate cuts may be recycled to the reactor, e. g., in the next run.

A light colored terephthalic acid product is obtained in a yield of about 55 mol percent of theory.

Following the above procedure except removing the formic acid and water as formed to maintain the concentration of each below about 5% of the reaction mixture (e. g., by condensing the vapor, and removing formic acid from the condensate together with water as desired, before recycling) gives about 65 to 70% yield. At the same time, a yield of about 10 parts of formic acid per 100 parts of terephthalic acid is recovered.

Example 2

The above Example 1 is repeated except using para-diethylbenzene, and an about 45% yield of terephthalic acid is obtained.

The above examples are repeated and comparable yields of the corrseponding phthalic acids are obtained from the following starting hydrocarbons:

| Example No. | Hydrocarbon | Acid Obtained |
|---|---|---|
| 4 | p-n-propyl toluene | terephthalic. |
| 5 | p-n-butyl toluene | Do. |
| 6 | p-i-butyl toluene | Do. |
| 7 | meta-cymene | isophthalic. |
| 8 | meta-diethylbenzene | Do. |
| 9 | meta-n-propyl toluene | Do. |
| 10 | meta-n-butyl toluene | Do. |
| 11 | meta-i-butyl toluene | Do. |
| 12 | ortho-cymene | phthalic. |
| 13 | ortho-diethylbenzene | Do. |
| 14 | ortho-n-propyl toluene | Do. |
| 15 | ortho-n-butyl toluene | Do. |
| 16 | ortho-i-butyl toluene | Do. |

In the case of the isophthalic acids, the crude solid isophthalic acid in the mixture is separated by filtration, and washed with about 10 parts by weight of benzene. Alternatively, it may be given three washings with about 100% lower carboxylic acid, e. g., acetic acid, with washing being with about 100 parts by weight of the acid per 40 parts of the precipitate, and then given three washings with water, using approximately similar amounts. The washings are recycled in the next run. The acid used herein may be that which is condensed and recovered from the vent gases from the reactor.

In the case of the phthalic acid, the acid may be recovered by heating to convert to the anhydride which may be sublimed and condensed.

The crude phthalic acids may be converted to the corresponding dimethyl phthalates by reaction with methanol or an analogous lower alkanol of two to three carbon atoms in the molecule, in the presence of a catalytic amount of an acid such as hydrochloric, sulfuric, phosphoric or the like, e. g., in an amount in the range of up to about 3% by weight of the reaction mixture. Alternatively, they may be first converted to the corresponding acid chloride and the latter reacted with methanol. The resulting dimethyl phthalates may be separated by fractionation, or purified by steam distillation. They are useful in the form of the esters, e. g., for preparation of poly ester type resins by reaction with polyhydric materials such as ethylene glycol, or glycerol or the like. If desired, the dimethyl ester may be converted to the acid by hydrolysis in the presence of dilute aqueous acid.

Desirable or comparable results are achieved with various modifications of the foregoing within the broad range set forth hereinbefore, including the following: the pressure should be sufficient to maintain a liquid phase, and if a lower monocarboxylic acid is included in the system, the liquid phase should contain at least some of the said acid. Generally, the pressure may be in the range of atmospheric up to about 1500 p. s. i. g.

The process may be conducted in a batch, intermittent, or a continuous manner.

Where the reaction system is such that the desired phthalic acid may be obtained directly or readily separated from the reaction mixture, even though no additional medium is present, it is preferred to avoid any such added medium; this condition may best be obtained in a cyclic reaction system where intermediate oxidation products are recycled to the initial reaction step. Where all the advantages of such an operation are not required, the medium may be included and this may be a monocarboxylic acid relatively stable or inert to oxidation in the reaction system, preferably containing about 2 to 6 carbon atoms in the molecule. In addition, aliphatic acids containing 2 to 4 carbon atoms in the molecule and free of hydrogen atoms attached to tertiary carbon atoms are preferred; mixtures of acids may be used.

The reaction temperature should be sufficiently high so that the desired oxidation reaction occurs and yet not so high as to cause undesirable charring or formation of tars, for instance in the range of 150 to 275° C., desirably 150 to 250° C., and preferably 160 to 190° C. The reaction time should be sufficient to obtain a desirable conversion of the hydrocarbon to the desired phthalic acid, e. g., in the range of about 0.5 to 25 or more hours, preferably up to about 4 hours.

Where the monocarboxylic acid medium is used, the amount thereof should not be more than necessary for convenience of handling or provision of the desired product, such as in the range of 1 to 10 parts by weight, desirably 1 to 4, and preferably 1 to 2.5 per part of the hydrocarbon.

The hydrocarbon fed into the reactor may be in the technically pure form free from contaminants or materials which may interfere with the oxidation. Generally, it may contain minor proportions of the isomeric materials or also some of the lower or higher homologues. It may also contain some saturated aliphatic or hydrocarbon materials of similar boiling ranges relatively resistant to oxidation in the system. Desirably, the hydrocarbons should be all about 95 to 100% pure.

Alternatively, mixtures containing the hydrocarbon may be used, converted to corresponding mixtures of phthalic acids, which acids may then be separated, e. g., by conversion to the esters and then fractionation.

The manganese carboxylate catalyst may be the manganese salt of any carboxylic acid, which salt is finely dispersed in the reaction system, desirably a monocarboxylic acid of 2 to 10 carbon atoms, and preferably the salt of an acid formed in the reaction system. Any manganese halide or the toluene sulfonate may be used. Unique results may be obtained with such catalysts. However, if all the advantages thereof are not required, other heavy metal compounds may be used instead. Mixtures thereof may be used.

The oxygen used may be in the form of substantially 100% oxygen gas or in the form of gaseous mixtures containing lower concentrations of oxygen, e. g., down to about 20%, such as in air. Where the gaseous mixture contains a relatively lower concentration of oxygen, a correspondingly higher pressure or flow rate of the gas should be used, so that a sufficient amount or partial pressure of oxygen is actually fed into the reaction mixture.

The ratio of total oxygen fed into the reaction mixture relative to the hydrocarbon is in the range of 4 to 500 mols of oxygen per mol of hydrocarbon, desirably in the range of 5 to 300, and preferably in the range of 5 to 75.

If desired, the process may be carried out step-wise, e. g., by converting the intermediate oxidation products by reaction with a molecular oxygen at the elevated temperatures and then converting the intermediate oxidation products to the phthalic acids by reacting with molecular oxygen in the presence of the heavy metal catalyst and the monocarboxylic medium. Under these conditions, substantial amounts of formic acid may be formed in the initial or preoxidation step, and it may be removed while being formed, or prior to addition of the catalyst and the acid medium, as well as after the addition of the latter.

Where the hydrocarbon contains a methyl group, it is preferred to use a heavy metal bromide, such as manganese bromide catalyst. It appears that the formation of formic acid is associated with the presence of alkyl groups of 2 to 4 carbon atoms, and accordingly at least one of these should be present in the material oxidized. The concentration of formic acid may be determined by the known so-called "mercuric oxide" method of analysis.

Formic acid is recovered in economic yields. With larger alkyl groups, more formic acid is recovered, up to about 25 parts per 100 parts of the phthalic acid; while, with the smaller alkyls, such as ethyl, less formic acid is recovered.

It is indeed surprising that the phthalic acids may be prepared from the indicated hydrocarbons in such a convenient manner in accordance with the invention, especially when one considers the cumbersome and costly methods suggested or practiced in the art, such as those involving nitric acid oxidation of meta or para xylene, or those involving conversion of xylene to toluic acid, followed by esterification, followed by oxidation, and then further esterification.

In view of the foregoing disclosures, variations and modifications of the invention will be apparent to those skilled in the art, and it is intended to include within the invention all such variations and modifications except as do not come within the scope of the appended claims.

This application is a continuation-in-part of our copending application Serial No. 305,972, filed August 23, 1952, now abandoned.

We claim:

1. In a process for the preparation of phthalic acids and formic acid from a dialkyl benzene wherein one alkyl contains from 1 to 4 carbon atoms and the other alkyl group contains 2 to 4 carbon atoms and wherein the carbon atom of each alkyl group attached directly to the ring has at least 1 hydrogen substituent by reacting said hydrocarbon with molecular oxygen in the presence of about 0.1 to 10% by weight of a manganese oxidation catalyst, and recovering the desired acids, the improvement comprising: removing from the vapors of the reaction system water and by-product formic acid as required to maintain the formic acid concentration thereof in the reaction mixture below about 5% and the water concentration below 10%.

2. A cyclic process for the preparation of phthalic acids and formic acid which comprises oxidizing with molecular oxygen a dialkyl benzene wherein one alkyl group contains from 1 to 4 carbon atoms and the other alkyl group contains 2 to 4 carbon atoms and wherein the carbon atom of each alkyl group attached directly to a ring carbon atom and has at least one hydrogen substituent, in the presence of a manganese compound as an oxidation catalyst in an amount of about 0.1 to 10% by weight of said catalyst based on the dialkyl benzene at a temperature in the range of 150 to 275° C. while removing by-product water and formic acid from vapors of the reaction system, at least to the extent that the formic acid concentration in the reaction mixture is below about 5% and the water concentration in the reaction mixture is below 10%, removing a portion of the reaction mixture, separating the solid phthalic acid product from the reaction mixture, and recycling to the oxidation reaction the remainder of the reaction mixture.

3. A process for the preparation of phthalic acids and formic acid which comprises oxidizing with molecular oxygen a dialkyl benzene wherein one alkyl group contains from 1 to 4 carbon atoms and the other alkyl group contains 2 to 4 carbon atoms and wherein the carbon atom of each alkyl group attached directly to a ring carbon atom and has at least one hydrogen substituent, in the presence of a saturated aliphatic mono carboxylic acid containing 2 to 6 carbon atoms in the molecule and in the presence of a manganese compound at a temperature of from 150 to 275° C. while removing from the vapors of the reaction mixture by-product water and formic acid to maintain a reaction mixture having a formic acid concentration of below about 5% and a water concentration of below 10%, recovering formic acid from the vapors of said oxidation reaction and separately recovering the phthalic acid product from the reaction mixture.

4. The process of claim 3 wherein the saturated aliphatic monocarboxylic acid is acetic acid.

5. The process of claim 3 wherein the dialkyl benzene is an alkyl substituted toluene containing 2 to 4 carbon atoms in the alkyl group and wherein the manganese compound employed as a catalyst is manganese bromide.

6. A process for the preparation of phthalic acids and formic acid which comprises oxidizing with molecular oxygen at a temperature of from 150 to 275° C. in the presence of a manganese compound as the catalyst the partial oxidation products of a dialkyl benzene having one alkyl group containing from 1 to 4 carbon atoms and the other alkyl group containing from 2 to 4 carbon atoms and wherein the carbon atom of each alkyl group attached directly to a ring carbon atom has at least one hydrogen substituent, removing by-product water and formic acid from the vapors of the reaction system to maintain a reaction mixture having a formic acid concentration of below 5% and a water concentration below 10%, recovering formic acid from the vapors from said oxidation process and separately recovering the phthalic acid product.

References Cited in the file of this patent

UNITED STATES PATENTS

| | | |
|---|---|---|
| 2,245,528 | Loder | June 10, 1941 |
| 2,531,173 | Toland | Nov. 21, 1950 |
| 2,552,278 | Hochwatt | May 8, 1951 |

FOREIGN PATENTS

| | | |
|---|---|---|
| 623,836 | Great Britain | May 24, 1949 |
| 681,455 | Great Britain | Oct. 22, 1952 |